(12) United States Patent
Choy

(10) Patent No.: US 7,216,126 B2
(45) Date of Patent: *May 8, 2007

(54) SYSTEM AND METHOD FOR RDBMS TO PROTECT RECORDS IN ACCORDANCE WITH NON-RDBMS ACCESS CONTROL RULES

(75) Inventor: David Mun-Hien Choy, Los Altos, CA (US)

(73) Assignee: International Business Machines Corporation, Armonk, NY (US)

( * ) Notice: Subject to any disclaimer, the term of this patent is extended or adjusted under 35 U.S.C. 154(b) by 659 days.

This patent is subject to a terminal disclaimer.

(21) Appl. No.: 10/407,387

(22) Filed: Apr. 4, 2003

(65) Prior Publication Data

US 2003/0191768 A1 Oct. 9, 2003

Related U.S. Application Data

(63) Continuation of application No. 09/598,553, filed on Jun. 21, 2000, now Pat. No. 6,581,060.

(51) Int. Cl.
*G06F 17/30* (2006.01)
(52) U.S. Cl. .............................. 707/9; 707/10; 707/103
(58) Field of Classification Search .................... 707/9, 707/10, 103; 709/229
See application file for complete search history.

(56) References Cited

U.S. PATENT DOCUMENTS

| | | | |
|---|---|---|---|
| 5,181,162 A | 1/1993 | Smith et al. ................. 364/419 |
| 5,511,186 A | 4/1996 | Carhart et al. .................. 707/2 |
| 5,553,218 A | 9/1996 | Li et al. ....................... 707/102 |
| 5,615,112 A | 3/1997 | Sheng et al. ................ 395/615 |
| 5,630,127 A | 5/1997 | Moore et al. ............... 707/104 |
| 5,644,770 A | 7/1997 | Burke et al. ................. 395/710 |
| 5,734,899 A | 3/1998 | Yoshizawa et al. ......... 707/203 |
| 5,745,896 A | 4/1998 | Vijaykumar ................... 707/1 |
| 5,809,317 A | 9/1998 | Kogan et al. ............. 707/501.1 |
| 5,826,268 A | 10/1998 | Schaefer et al. ............... 707/9 |
| 5,937,402 A | 8/1999 | Pandit ........................... 707/4 |
| 5,978,811 A | 11/1999 | Smiley ........................ 707/103 |
| 5,991,776 A | 11/1999 | Bennett et al. ............. 707/205 |
| 6,012,067 A | 1/2000 | Sakar ..................... 707/103 R |
| 6,029,160 A | 2/2000 | Cabrera et al. ................ 707/1 |

(Continued)

OTHER PUBLICATIONS

The ACM digital Library,"Extensible access control for a hierarchy of servers", Jul. 1994, ACM Press, vol. 28, Issue 3.*

*Primary Examiner*—Jeffrey Gaffin
*Assistant Examiner*—CamLinh Nguyen
(74) *Attorney, Agent, or Firm*—John L. Rogitz

(57) ABSTRACT

A system and method are provided for an information management system (IMS) having an underlying relational database management system (RDBMS) that allows applications to access the RDBMS directly for improved performance without going through the IMS, while maintaining access control. An access control list (ACL) is generated, with tables in the RDBMS being bound using codes in the ACL. At run time or, more preferably, pre-run time, user-defined functions (UDF) evaluate access control attributes and generate an access authorization table, which is joined with the appropriate information table(s) in response to a query against a view on the table. The view is presented to the querying user. Thus, access control rules are encapsulated in the view that is presented to the user.

17 Claims, 2 Drawing Sheets

U.S. PATENT DOCUMENTS

| | | | |
|---|---|---|---|
| 6,038,563 A * | 3/2000 | Bapat et al. | 707/10 |
| 6,067,542 A | 5/2000 | Carino, Jr. | 707/4 |
| 6,085,031 A | 7/2000 | Johnson et al. | 345/727 |
| 6,085,191 A | 7/2000 | Fisher et al. | 707/9 |
| 6,088,694 A | 7/2000 | Burns et al. | 707/2 |
| 6,112,209 A | 8/2000 | Gusack | 707/101 |
| 6,151,623 A | 11/2000 | Harrison et al. | 709/206 |
| 6,154,741 A | 11/2000 | Feldman | 707/9 |
| 6,336,114 B1 | 1/2002 | Garrison | 707/9 |
| 6,385,730 B2 | 5/2002 | Garrison | 713/202 |
| 6,453,353 B1 * | 9/2002 | Win et al. | 709/229 |
| 6,473,748 B1 | 10/2002 | Archer | 706/45 |
| 6,581,060 B1 * | 6/2003 | Choy | 707/9 |

* cited by examiner

ARCHITECTURE

DATA STRUCTURE

SYSTEM AND METHOD FOR RDBMS TO PROTECT RECORDS IN ACCORDANCE WITH NON-RDBMS ACCESS CONTROL RULES This application is a continuation of application Ser. No. 09/598,553, filed Jun. 21, 2000, now U.S. Pat. No. 6,581,060 for an invention entitled SYSTEM AND METHOD FOR RDBMS TO PROTECT RECORDS IN ACCORDANCE WITH NON-RDBMS ACCESS CONTROL RULES, from which priority is claimed.

FIELD OF THE INVENTION

The present invention relates to methods and systems for allowing applications to directly access a relational database while protecting records in the database.

BACKGROUND OF THE INVENTION

Information management systems (IMS) typically use a relational database management system (RDBMS) to manage data records in a database. As an example, an IMS might manage document data, with the desire that some documents can be read by all users but only written to by a few. Many other high-level access rules can be enforced by the IMS. In any case, when a user wants to access the records of a document in the RDBMS, the user is routed through the IMS to first check for access control.

The documents themselves are broken down into records of various formats by the IMS and the records are stored in tabular form in the RDBMS, which can efficiently manage the records for querying using a language known as SQL. Only the IMS knows the high level access control rules. User applications must access the RDBMS indirectly, through the IMS, to ensure integrity and protection of data.

Unfortunately, as recognized herein requiring applications to access data indirectly, i.e., through the IMS, slows down performance. As stated above, however, with the current state of the art, applications cannot be permitted to access the RDBMS directly because this would bypass the access control functions of the IMS. Moreover, the present invention recognizes that RDBMS manage low level access protection for sets of homogeneously structured records, and not for individual entities. The IMS must enforce access protection rules at the entity (document) level.

As also recognized herein, some new applications, such as e-commerce applications, require heretofore unusual rules in the database context, namely, distribution rules (as opposed to access rules) that are related to content licensing. These licensing rules can and do change over time, so that a data system's protection rules advantageously should be extensible. The present invention recognizes that it would be desirable to allow a user to access an RDBMS directly, without first going through an IMS, while maintaining IMS access control and without requiring reengineering of the RDBMS to account for extensions of access control.

SUMMARY OF THE INVENTION

The invention is a general purpose computer programmed according to the inventive steps herein. The invention can also be embodied as an article of manufacture—a machine component—that is used by a digital processing apparatus and which tangibly embodies a program of instructions that are executable by the digital processing apparatus to undertake the present invention. This invention is realized in a critical machine component that causes a digital processing apparatus to perform the inventive method steps herein. The invention is also a computer-implemented method for undertaking the acts disclosed below.

Accordingly, a computer program product includes computer usable code means programmed with logic for enforcing high level access control rules of an information management system (IMS) for an application directly communicating with a relational database management system (RDBMS) associated with the IMS. The program product includes computer readable code means for binding at least one RDBMS table using one or more access control list (ACL) codes representing the high level access control rules. Also, the logic includes computer readable code means for issuing a query from the application against an RDBMS view, and computer readable code means return the result of the query against the view.

In another aspect, a data system includes a server computer programmed to undertake method acts for responding to user queries for data from a database controlled by the server computer. The method acts undertaken by the server computer include receiving a query, and receiving an access control output from at least one algorithm. In response to the query and the access control output, the computer populates a view for presentation thereof to the user. Thus, the view encapsulates the access control rules.

The system can include a database management system (DBMS), and the application directly communicates with the DBMS. In a particularly preferred embodiment, the method executed by the computer includes defining at least one view on at least one table in the database, and executing a query against the view using at least the access control output. The results of the query against the view are then returned.

As set forth in detail below, the access control output preferably is represented by at least one Access Authorization table (AAT), and the view is defined as a join between the AAT and the information table. The tables are joined using a join key, and the join key is at least one access control code binding the information table to the AAT. With this system, multiple rows of the information table can be bound to respective multiple access control rules, or all rows of the information table can be bound to a single set of access control rules.

In another aspect, a method is disclosed for enforcing at least one access control rule in a data system including at least one application accessing at least one information management system (IMS) associated with a database management system (DBMS). The method includes receiving a specification for IMS data schema and generating a DBMS view in response to the specification, with the view encapsulating the IMS access control rule. The view is then presented to a user via a direct communication path to the DBMS.

In still another aspect, a system includes at least one information management system (IMS), at least one application communicating with the IMS, and at least one relational database management system (RDBMS) communicating with the IMS. The application communicates directly with the RDBMS via at least one direct communication path that does not include the IMS.

In yet another aspect, a method is disclosed for enforcing high level access control rules of an information management system (IMS) for an application directly communicating with a relational database management system (RDBMS) that is associated with the IMS. The method includes providing at least one access authorization table (AAT). The AAT contains data: representing high level access control rules. Also, the method includes providing at least one information table in the RDBMS, and in response to a query for data from the application, the AAT is joined with at least one information table to return a result in accordance with at least one of the high level access control rules.

In another aspect, a data system includes a server computer programmed to undertake method acts for responding to user queries for data from a database controlled by the server computer. The method acts undertaken by the server computer include storing the database in a second system, such as but not limited to a DBMS and more particularly a RDBMS, and maintaining access control specifications that restrict access to data. The methods acts also include allowing a user to access data directly through the second system, and in response to the direct access by the user, causing the second system to enforce the access control specifications without intervention from the data system.

In a preferred implementation of this aspect, the user is an application. In one preferred embodiment the data system supports a data model that is different from a data model supported by the second system, whereby the access control specifications are not directly enforceable by a native access control capability of the second system.

As set forth in further detail below, the access control specifications preferably are stored in at least a first table in the RDBMS, and a RDBMS view is generated by joining a data table with the first table. The view can be used by the user for directly accessing data. Preferably, the view includes at least one UDF on the first table, with the UDF implementing the data system's access control model. The view can be created when the data table is created. Moreover, resolutions of the access control specifications can be computed using the data system's access control model and stored in an access authorization table (AAT) in the RDBMS. Thus, in a particularly preferred embodiment the RDBMS view is a join between a data table and the AAT, for use of the view by a user for direct access to data.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
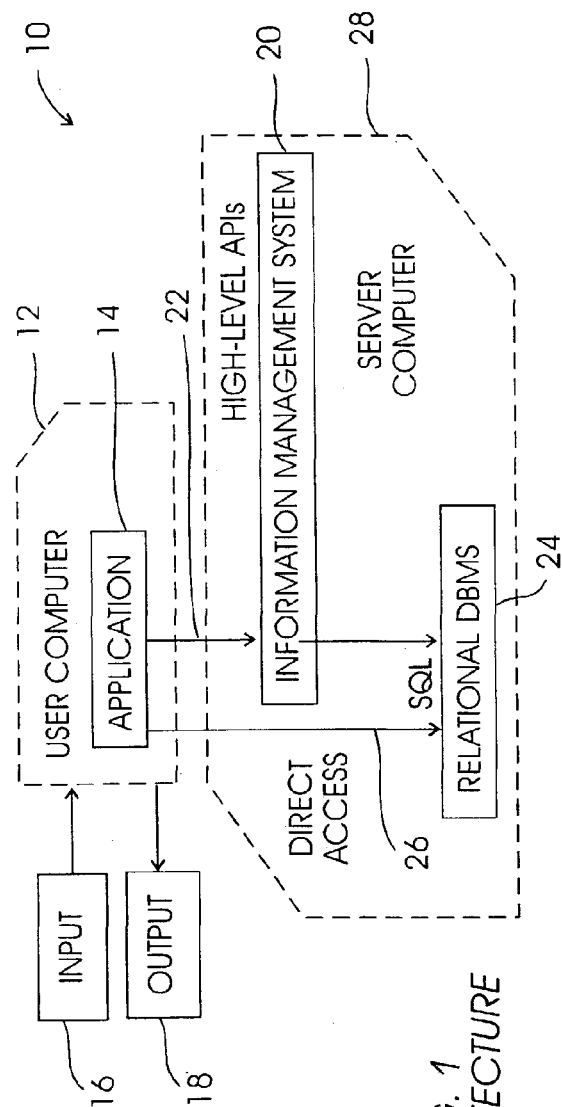
FIG. 1 is a block diagram of the present system.

Referring initially to FIG. 1, a system is shown, generally designated 10, that includes at least one user computer 12 having a software-implemented application 14 that generates queries. Input to the user computer 12 is via one or more input devices 16, and query results can be output on an output device 18. The input device 16 can be any suitable device, such as a keyboard, keypad, mouse, joystick, trackball, voice-recognition software, and so on. The output device 18 can be a monitor, a speaker, another computer or computer network, a printer, and so on.

As shown in FIG. 1, the user computer 12 communicates with an information management system (IMS) 20 via an IMS communication path 22 using high-level application programming interfaces (API). The IMS 20 communicates with a relational database system (RDBMS) 24, such as the present assignee's DB2, that stores records of documents managed by the IMS 20, with the IMS 20 enforcing high level access control rules pertaining to the application 14 vis-a-vis the records of the RDBMS 24. Each IMS document consists of a root record, which is a row in a root table, and optionally some number of dependent records, which are rows in certain dependent tables. The way the system 10 achieves this enforcement, which is the subject of the present invention, enables the application 14 to issue queries and otherwise to communicate, via a direct communication path 26, directly with the RDBMS 24 using SQL (or other DBMS query language) without the direct communication path 26 going through the IMS 20 while nevertheless maintaining access control. One or both of the IMS 20 and RDBMS 24 can be hosted on a server computer 28, or each can have its own associated computer.

As intended herein, either or both of the user computer 12/server computer 28 can be a server computer made by International Business Machines Corporation (IBM) of Armonk, N.Y. Other digital processors, however, may be used, such as personal computers, laptop computers, mainframe computers, palmtop computers, personal assistants, or any other suitable processing apparatus can be used.

In any case, the processor of the computers access appropriate software to undertake the logic of the present invention, which may be executed by a processor as a series of computer-executable instructions. The instructions may be contained on a data storage device with a computer readable medium, such as a computer diskette having a computer usable medium with a program of instructions stored thereon. Or, the instructions may be stored on random access memory (RAM) of the computer, on a DASD array, or on magnetic tape, conventional hard disk drive, electronic read-only memory, optical storage device, or other appropriate data storage device. In an illustrative embodiment of the invention, the computer-executable instructions may be lines of C or C++ or Java code.

Indeed, the flow charts herein illustrate the structure of the logic of the present invention as embodied in computer program software. Those skilled in the art will appreciate that the flow charts illustrate the structures of computer program code elements including logic circuits on an integrated circuit, that function according to this invention. Manifestly, the invention is practiced in its essential embodiment by a machine component that renders the program code elements in a form that instructs a digital processing apparatus (that is, a computer) to perform a sequence of function steps corresponding to those shown.

Figure 2:
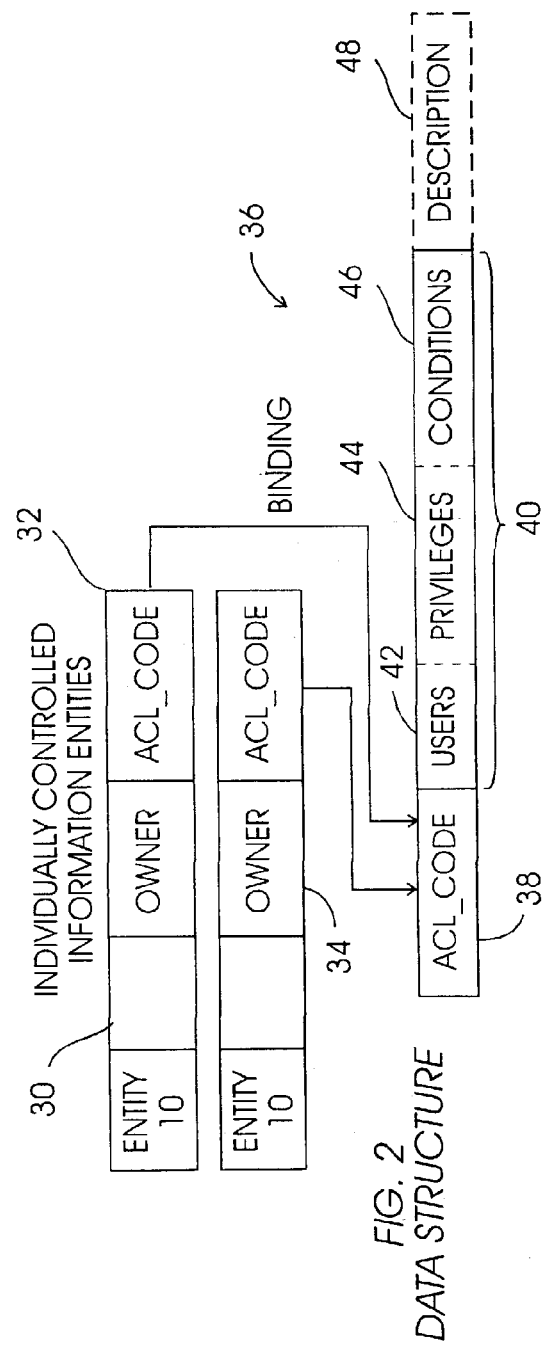
FIG. 2 is a schematic representation of the data structure of an access control list (ACL)

FIG. 2 schematically shows root information entities 30 that include respective access control list (ACL) codes 32 and respective owner fields 34. The owner field is needed only if each information entity has a distinct owner. Each root record 30 might have further dependent entities which, like the root record, have entity identifications. The owner field 32 can specify one or more owners or it can be null. If owner privilege is enabled, the owner of an entity can perform all legitimate operations on an entity he owns. Alternatively, table-level access control, instead of entity-level, can be established by ignoring the ACL codes 32 in each entity and associating the entire information table with a single ACL code that is recorded in an RDBMS system table.

In any case, the user defines which ACL codes pertain to which entities, with the ACL codes 32 being associated with the row (or table) defined by the user. The user can change or delete access control rules, and when this occurs the ACL codes 32 of the information tables are changed accordingly. Thus, as intended by the present invention, when entity-level access control is established the entities 30 are bound by means of the ACL codes 32 to access control rules embodied in an access control table, generally designated 36. Specifically, the access control table 36 includes plural rows, each having an ACL code field 38 that, along with the ACL code 32 in the entities 30, is the binding key. Also, each ACL code field 38 has an associated ACL attribute 40 that in one preferred embodiment includes a user attribute 42, a privileges attribute 44, and a conditions attribute 46. If desired, a description field 48 can be provided to describe the ACL rules embodied in the ACL attribute 40.

The user attribute 42 specifies the user to which the privileges attribute 44 and conditions attribute 46 pertain. It can represent a single user by identification, or a group of users by group ID. Moreover, the user attribute 42 can be qualified, i.e., it can be evaluated for users belonging to a specific department, acting in a certain role, possessing a particular certificate, holding a certain content subscription, or performing a predetermined action (e.g., paying a preselected sum of money). It will be appreciated that in evaluating the user attribute 42, a RDBMS user-defined function (UDF) might access one or more auxiliary tables or even interact with a system external to the system 10.

On the other hand, the privileges attribute 44 specifies the operations that the user associated with the user attribute 42 is allowed to perform. To support licensing rules as might be required in e-commerce, operations that are not supported by the system 10 can be included as well. One preferred way to represent a privilege is by using a bit vector, in which each bit represents whether an operation or a set of operations is allowed or not.

In contrast, the conditions attribute 46 represents whether certain optional conditions apply to the privileges represented by the privileges attribute 44. Examples of conditions include temporal conditions (e.g., the privileges can be exercised only during a predetermined period), environment conditions (e.g., access can be had only from a corporate intranet), and usage conditions, e.g., only five users at a time can access an entity.

In accordance with the present invention, the values in the ACL attribute 40 are interpreted, using SQL, by respective user-defined functions (UDFs). Given a user, a user's state, an operation requested by the user on a target entity 30, and a system state, an ACL attribute value can be evaluated to either "allow" or "disallow" with respect to the requested operation. Thus, the access protection rules are encapsulated in the ACL attribute 40. With this in mind, the skilled artisan will recognize that advantageously, both the ACL attribute 40 and the UDFs can be extended without changing the logic of the system 10.

Figure 3:
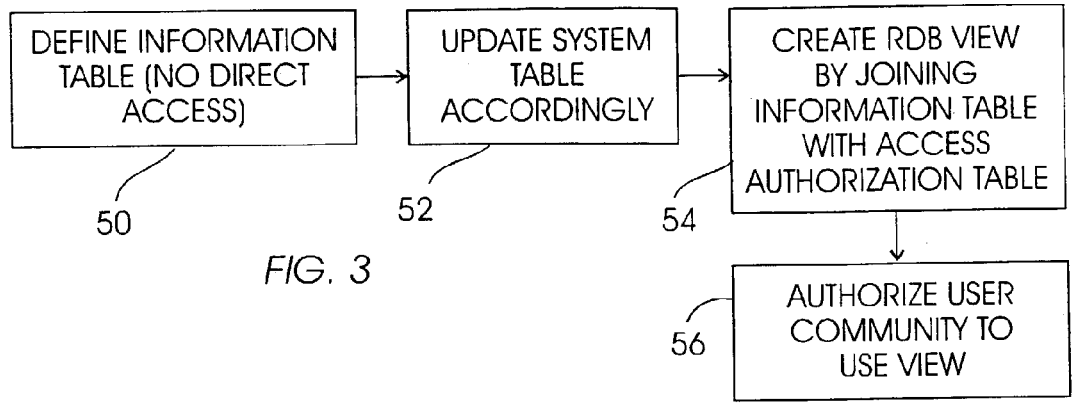
FIG. 3 is a flow chart of the logic for generating a global RDBMS view embodying access control rules.

Now referring to FIG. 3, the logic embodying portions of the above description can be seen. Commencing at block 50 an information table in the RDBMS 24 is defined to the IMS 20 by a user and the system table updated at block 52. The information table remains unaccessible to users directly.

Moving to block 54, a relational database view is created by joining the information table created at block 52 with the Access Authorization Table (AAT), described more fully below. The view, having incorporated access control rules from the AAT, thus embodies both information and access control rules. Next, at block 56 the entire user community is authorized to use the view created at block 54.

Figure 4:
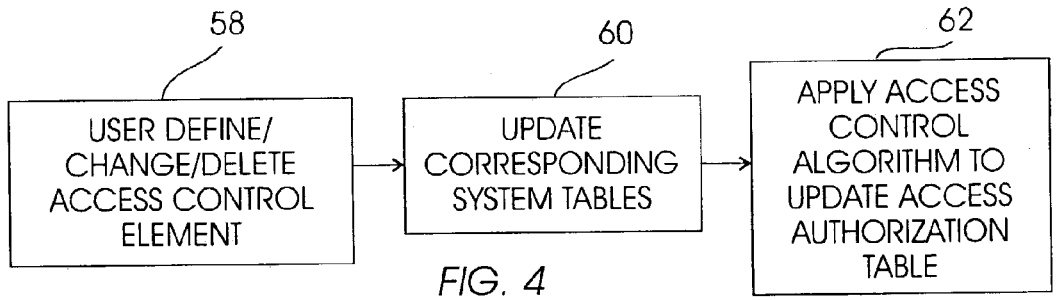
FIG. 4 is a flow chart showing the logic for generating/updating the Access Authorization Table.

FIG. 4 shows the logic for defining, updating, and deleting access control rules. At block 58 the definition/update/deletion is received by the IMS 20, and the below-described corresponding system tables pertaining to the access control rule involved at block 58 are changed accordingly at block 60. In the preferred embodiment, the logic continues to block 62 to undertake certain precomputing, namely, the generation/modification of the AAT, which is essentially a combination of the various system tables related to access control and modified at block 60.

Accordingly, at block 62 an algorithm that implements the IMS's high-level access control model is applied to the below-described system tables to render or update the AAT. When the step at block 62 is precomputed, the algorithm can be a UDF associated with the RDBMS, or it can be an algorithm that is resident in and executed by the IMS 20. In contrast, if precomputing is not used and the step at block 62 is executed at query time, a UDF must be used to evaluate the algorithm to support direct access 26.

Figure 5:
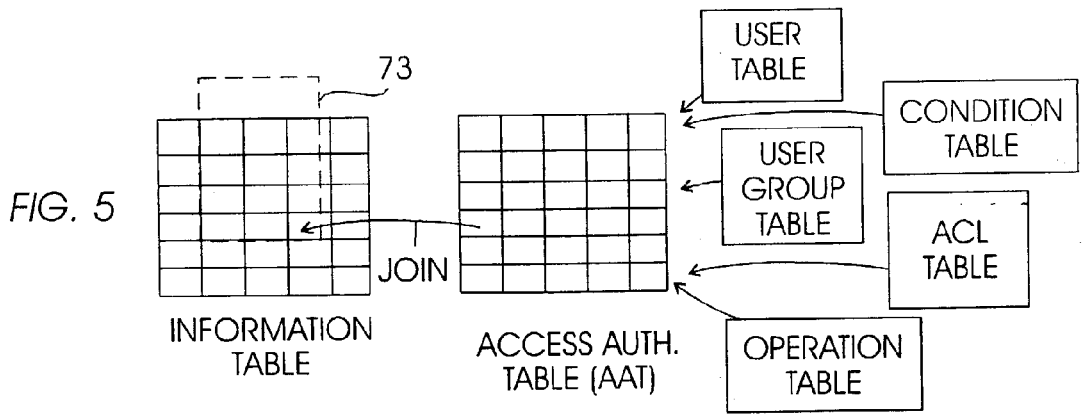
FIG. 5 is a schematic diagram of an information table being joined with an ACL table.

FIG. 5 illustrates the above-mentioned system tables that pertain to access control, and the AAT that is derived therefrom. A user table, a user group table, an operation table, a condition table, and an access control list (ACL) table are shown in FIG. 5. Depending on the implementation, there may be additional tables. The user table and user group table essentially embody a set of user attributes 42 (FIG. 2), while the operation table contains permissible operations and, thus, essentially embodies (with proper processing) the privileges attributes 44 (FIG. 2). The condition table embodies the conditions attribute 46, and the ACL table embodies the binding between these and other tables.

As described above in relation to block 62 of FIG. 4, the access control attributes embodied in the user table, user group table, operations table, condition table, and ACL table are evaluated in accordance with the high-level access control model to render a single Access Authorization table. Accordingly, the Access Authorization table represents access control rules, namely, user, privilege, and condition attributes shown in FIG. 2.

Figure 6:
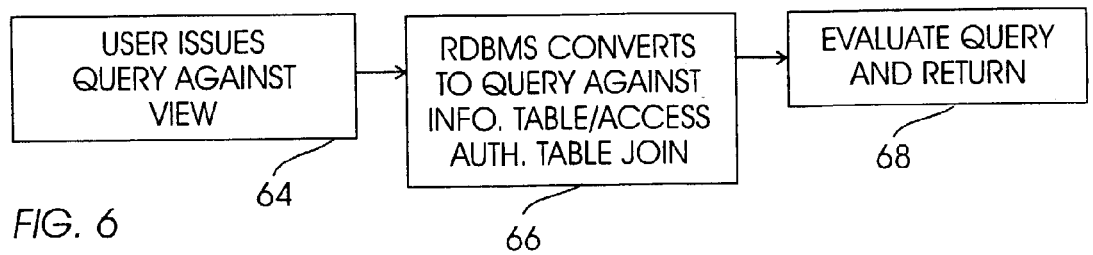
FIG. 6 is a flow chart of the logic for executing a query using the present system.

It may now be further appreciated in light of the above disclosure how the applicable access control rules are folded into the view that is presented by the RDBMS directly to the application at query time. Referring to FIG. 6, at block 64 a user such as the application 14 of FIG. 1 accesses the RDBMS 24 via the direct access path 26 and issues a query against the view created at block 54 of FIG. 3. Moving to block 66 of FIG. 6, the RDBMS 24 converts the query to a query against the relevant information table(s) and the AAT, which query is evaluated and the AAT table joined to the information table(s) to populate the view at block 68. The query results are then returned to the user via the direct access path 26.

The above join between the information table(s) and AAT is accomplished using the ACL codes 32, 38 (FIG. 2) as a join key as indicated by line "join" in FIG. 5, and containing a predicate to select rows from the AAT that are applicable to the user and the intended operation. Thus, the information table implicated in the query is joined with the Access Authorization table as indicated in FIG. 5 to populate a view tailored for a particular user. Accordingly, when a query is issued at block 68 by a user against the view, which encapsulates the access control rules applicable to the user, the result of the query accounts for the IMS's access control.

Consequently, with the IMS's access control rules folded adaptively into the view, there is no need for the RDBMS to enforce access control rules explicitly. In other words, in contrast to conventional RDBMS systems, the present logic does not require special SQL statements to control information access.

In one preferred embodiment, the view generation syntax when implementing access control on a row by row basis on an information table (a feature not provided in conventional systems) is as follows.

```
CREATE VIEW R_ABC AS
SELECT * FROM ABC
WHERE OWN (OWNER, USER) = 1
    OR
    ACL_CODE IN
        (SELECT ACL_CODE FROM ACLTABLE
            WHERE ALLOW (ACL, USER, "READ") = 1);
GRANT SELECT ON R_ABC TO PUBLIC;
where
    ABC is a root-record table created by a user,
containing system attributes OWNER and
ACL_CODE, USER is a DB2 Special Register
that contains the authorization ID for the current
user, ACLTABLE is the access control list table
shown in Figure 2, OWN( ) is a system-provided
UDF on OWNER attribute, which checks whether
a user is an owner, and ALLOW( ) is a system-
provided UDF on ACL attribute, which checks
whether a user has a certain privilege.
```

Although in this example access privilege on this generated view R_ABC is granted to the public, it can instead be granted to selected users. Such users may further create more restrictive views on this view and authorize other users to use the more restrictive views.

The R_ABC view above is generated for use by all users on a root-record table ABC. The "OWN(OWNER,USER) =1" predicate is needed only if the owner privilege is enabled. Checking of the IMS protection rules is undertaken by the UDF ALLOW( ), which essentially encapsulates the ACL attribute of the ACL table shown in FIG. 2. With this encapsulation, any protection rules and models can be supported by the system 10, as well as multiple models so long as the UDF ALLOW( ) is able to determine which model is applicable for the conditions. Furthermore, encapsulation also facilitates subsequent protection extension or the addition of a new protection model to extend the system 10, because such changes are confined to the ACL attribute (rule representation) and its UDFs (rule interpretation).

The sub-query SELECT ACL_CODE FROM ACLTABLE identifies the set of ACL codes that the current user is authorized to read. The view masks/filters the table according to the access control rules as applied to a given user and to each respective record in the information table.

In any case, in one preferred embodiment the sub query can be predefined as a separate view ReadAuthorization as follows, so that it can be reused by other view definitions and so that system performance is enhanced.

```
CREATE VIEW ReadAuthorization AS
SELECT ACL_CODE FROM ACLTABLE
WHERE ALLOW(ACL, USER, "READ") = 1;
CREATE VIEW R_ABC AS
```

```
SELECT * FROM ABC
WHERE OWN (OWNER, USER) = 1
    OR
    ACL_CODE IN•(SELECT ACL_CODE FROM
        ReadAuthorization);
GRANT SELECT ON R_ABC TO PUBLIC;
```

As known to the skilled artisan, there are alternate syntax that would create equivalent views.

It is to be understood that when the triplets of attributes shown in FIG. 2 are used, the ALLOW( )=1 predicate set forth above can be replaced by a test for the existence, among the collection of triplets (USERS, PRIVILEGES, CONDITIONS) of a triplet that satisfies USR(USERS, USER)=1 AND READ(PRIVILEGES)=1 AND SATISFY (CONDITIONS)=1, where USR( ), READ( ), and SATISFY( ) are UDFs that respectively check whether the user is authorized, whether the READ privilege is granted, and whether any conditions are satisfied.

Although the AAT is preferably precomputed as discussed above, it can be determined at query time from the various system tables that pertain to access control. Moreover, as intended by the present invention the reusable view described above can be materialized using DB2 Summary Table capability or as a dependent table managed by the IMS 20. It can be materialized or refreshed as user logon, and can be evaluated either directly from the ACL table or indirectly from an intermediate view or Summary Table that contains the ACL_Codes for all users. This intermediate table can be refreshed when new rules are added, altered, or deleted. Because access protection is checked by the UDF and not by the RDBMS, the UDF ALLOW( ) can use the user ID passed as a parameter instead of using the USER variable, such that a "trusted application" (e.g., a http server) can operate under a single RDBMS user ID on behalf of many system users, and can authenticate users and pass their IDs to the RDBMS. This allows a reuse of RDBMS connections for different users as well as exploiting DB2's static query and statement caching features for improved performance.

It was mentioned above that in addition to providing access of root tables in the RDBMS, the system 10 supports access of dependent tables. This can be undertaken as follows, in which "DEF" is a dependent record table of root table ABC in the context of IMS documents, OWN( ) is a UDF, and the sub-query "SELECT A.ENTITY_ID FROM ABC" identifies the set of entity IDs (obtained from the root records) such that the user is either an owner or READ-authorized user for these entities. An Entity-ID identifies a document, and is stored in every record of the document.

```
CREATE VIEW R_DEF AS
SELECT * FROM DEF
WHERE ENTITY_ID IN
    (SELECT A.ENTITY_ID FROM ABC A, ReadAuthorization R
        WHERE OWN(A.OWNER, USER) = 1 OR
        A.ACL_CODE=R.ACL_CODE);
GRANT SELECT ON R_DEF TO PUBLIC;
```

It was also mentioned that in addition to instance-level protection, set-level protection (also referred to herein as table-level protection) can be provided as follows:

```
CREATE VIEW R_XYZ AS
SELECT * FROM XYZ
WHERE 123 IN (SELECT ACL_CODE FROM ReadAuthorization);
GRANT SELECT ON R_XYZ TO PUBLIC;
where
XYZ is a table of information entities, 123 is the ACL_CODE
assigned to protect the table.
```

For heterogenous sets, set membership must be maintained for each member of the set by, e.g., keeping the containing set entity ID in the root record or by storing it in a separate table. A view is then generated using the principles set forth above for generating set-level views.

It is to be understood that in the above examples, a "READ" operation was shown, but UPDATE operations can also be undertaken using a U_ACL view instead of an ReadAuthorization view.

While the particular SYSTEM AND METHOD FOR RDBMS TO PROTECT RECORDS IN ACCORDANCE WITH NON-RDBMS ACCESS CONTROL RULES as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for" or, in the case of a method claim, the element is recited as a "step" instead of an "act".

I claim:

1. A data system including an information management system (IMS) programmed to undertake method acts for controlling access to a database management system (DBMS) in communication with the IMS for responding to user queries, the method acts undertaken by the data system including:

prior to a query time, receiving a precomputed Access Authorization table (AAT) generated by at least one algorithm; and at a subsequent query time, in response to a query and using the AAT, populating a view for presentation thereof to the user; wherein the user communicates with the IMS over a first data path, the user also communicating directly with the DBMS over a second data path at least to receive query results directly from the DBMS without the results going through the IMS, wherein the query is executed by joining the Access Authorization table and the information table.

2. The system of claim 1 wherein the algorithm is a UDF (user defined function) associated with a DBMS.

3. The system of claim 1 wherein the algorithm is resident in and executed by an application generating the query.

4. The system of claim 1 wherein the AAT is generated by joining at least two of: a user table, a user group table, an operation table.

5. The system of claim 1 wherein at least one element in the AAT is modified at a change time prior to query time, the change time being established by at least one of: a definition of a new access control element, a change to an access control element, a deletion of an access control element.

6. The system of claim 1 wherein the query is received from an application.

7. The system of claim 1 wherein the method acts further comprise:

defining at least one view on at least one table in the DBMS;

executing a query against the view using at least the AAT; and returning the results of the query against the view.

8. A method for enforcing at least one access control rule in a data system including at least one application accessing at least one information management system (IMS) associated with a database management system (DBMS), the application accessing the DBMS using at least one direct communication path bypassing the IMS, the method comprising:

prior to a query time, receiving at least one access control rule;

reflecting the access control rule in an access control table (AAT) in response to receiving or changing the access control rule, prior to the query time; then receiving a query for data; and populating a view in response to the query using the AAT, such that the view encapsulates the access control rule, wherein the AAT is generated by at least one algorithm resident in and executed by an application generating the query.

9. The method of claim 8, further comprising presenting the view to a user via the direct communication path between a DBMS and the user.

10. The method of claim 8, wherein the AAT is generated by at least one UDF (user defined function) associated with a DBMS.

11. The method of claim 8, wherein the AAT is generated by joining at least two of: a user table, a user group table, an operation table.

12. The method of claim 8, wherein at least one element in the AAT is modified at a change time prior to query time, the change time being established by at least one of: a definition of a new access control element, a change to an access control element, a deletion of an access control element.

13. A method for enforcing high level access control rules of an information management system (IMS) for an application directly communicating with a relational database management system (RDBMS) associated with the IMS, comprising:

providing at least one precomputed Access Authorization table (AAT), the AAT containing data representing high level access control rules, the AAT being computed prior to a query time;

providing at least one information table in the RDBMS; and in response to a query for data from the application, joining the AAT with at least one information table to return a result in accordance with at least one of the high level access control rules.

14. The method of claim 13, wherein the AAT is generated by at least one UDF (user defined function) associated with the RDBMS.

15. The method of claim 13, wherein the AAT is generated by at least one algorithm resident in and executed by the application generating the query.

16. The method of claim 13, wherein the AAT is generated by joining at least two of: a user table, a user group table, an operation table.

17. The method of claim 13, wherein at least one clement in the AAT is modified at a change dine prior to query time, the change time being established by at least one of: a definition of a new access control element, a change to an access control element, a deletion of an access control element.

* * * * *